(12) United States Patent
Yu (10) Patent No.: US 10,036,518 B2
(45) Date of Patent: *Jul. 31, 2018

(54) WORKING LIGHT (71) Applicants: HANGZHOU GREAT STAR TOOLS CO., LTD., Hangzhou, Zhejiang (CN); HANGZHOU GREAT STAR INDUSTRIAL CO., LTD., Hangzhou, Zhejiang (CN)

(72) Inventor: Wentian Yu, Zhejiang (CN)

(73) Assignees: HANGZHOU GREAT STAR TOOLS CO., LTD. (CN); HANGZHOU GREAT STAR INDUSTRIAL CO., LTD. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,425

(22) Filed: Nov. 29, 2016

(65) Prior Publication Data
US 2017/0074469 A1 Mar. 16, 2017

Related U.S. Application Data

(63) Continuation of application No. 14/369,778, filed as application No. PCT/CN2014/073443 on Mar. 14, 2014, now Pat. No. 9,534,748.

(51) Int. Cl.
*F21L 4/04* (2006.01)
*F21L 4/06* (2006.01)
(Continued)

(52) U.S. Cl.
CPC .............. *F21L 4/06* (2013.01); *F16L 11/1185* (2013.01); *F21L 4/00* (2013.01); *F21L 4/045* (2013.01);
(Continued)

(58) Field of Classification Search
CPC . F21L 4/005; F21L 4/022; F21L 4/025; F21L 4/027; F21L 4/04; F21L 4/045; F21L 4/06
(Continued)

(56) References Cited

U.S. PATENT DOCUMENTS 5,517,392 A 5/1996 Rousso
5,570,949 A 11/1996 Chiang
(Continued)

FOREIGN PATENT DOCUMENTS

CN 201028300 2/2008
CN 201555032 8/2010
(Continued)

*Primary Examiner* — Jason Moon Han
(74) *Attorney, Agent, or Firm* — Ostrolenk Faber LLP (57) ABSTRACT

The present invention discloses a working light, comprising a base, an illumination member and a switch control, a battery is arranged inside said base to supply power to said illumination member, said base is connected to said illumination member by a connection portion, said base and said illumination member are respectively connected to said connection portion by the same connection structures. By this arrangement, said base cannot be connected to said illumination member directly, users would not make mounting errors in use. In a preferred embodiment of the present invention, said connection portion is a serpentine hose or a joint-sleeve, wherein the serpentine hose includes a corrugated pipe and an internal star-shaped pipe, a wire and an iron wire which are arranged inside the corrugated pipe, this serpentine hose couples stiffness with toughness, after adjusting the curved shape, it is not easily deformed. The working light in the present invention overcomes several problems of the current portable illumination light and have a wide range of application, which can satisfy different requirements of users.

16 Claims, 4 Drawing Sheets

(51) Int. Cl.
  *F21L 4/00* (2006.01)
  *F21V 5/04* (2006.01)
  *H01B 9/00* (2006.01)
  *F21V 21/08* (2006.01)
  *F16L 11/118* (2006.01)
  *F21V 21/14* (2006.01)
  *F21V 23/02* (2006.01)
  *F21V 23/04* (2006.01)
  *F21V 23/06* (2006.01)
  *F21V 31/00* (2006.01)
  *F21Y 101/00* (2016.01)
  *F21Y 115/10* (2016.01)
  *F21V 1/00* (2006.01)

(52) U.S. Cl.
  CPC ............... *F21V 5/04* (2013.01); *F21V 21/08* (2013.01); *F21V 21/145* (2013.01); *F21V 23/02* (2013.01); *F21V 23/0421* (2013.01); *F21V 23/06* (2013.01); *H01B 9/006* (2013.01); *F21L 2001/00* (2013.01); *F21V 31/00* (2013.01); *F21Y 2101/00* (2013.01); *F21Y 2115/10* (2016.08)

(58) Field of Classification Search
  USPC .......................................... 362/194, 197–199
  See application file for complete search history.

(56) References Cited

U.S. PATENT DOCUMENTS

| | | | |
|---|---|---|---|
| 5,716,121 A | | 2/1998 | Dubois |
| 5,944,407 A | * | 8/1999 | Lynch .................. F21L 4/06 362/184 |
| 2007/0030672 A1 | | 2/2007 | Offiler |

FOREIGN PATENT DOCUMENTS

| | | |
|---|---|---|
| CN | 201748174 | 2/2011 |
| CN | 202532359 | 11/2012 |
| CN | 203395613 | 1/2014 |

\* cited by examiner

WORKING LIGHT

CROSS-REFERENCE TO RELATED APPLICATIONS

The present patent application is a continuation of prior U.S. patent application Ser. No. 14/369,778, filed Jun. 30, 2014, by Wentian Yu, entitled "WORKING LIGHT," which is a 35 U.S.C. § 371 National Phase conversion of International Application No. PCT/CN2014/073443, filed Mar. 14, 2014. The PCT International Application was published in the Chinese language. The entire contents of each of these applications are incorporated herein by reference.

FIELD OF THE INVENTION

The present invention relates to the field of lighting technology, and particularly relates to a working light.

DESCRIPTION OF THE PRIOR ART

In the field of lighting technology, a flashlight is a common portable lighting tool, which includes a base and an illumination member, the portion which supplies power to the illumination member being usually provided in the base. Flashlights need to be held in hands of the users, which greatly constrains users and prevents users from performing another operation at the same time. In order to facilitate practical use, a person skilled in the art improves a flashlight, and presents a structure of a working light. This working light uses a flexible serpentine hose to connect the base with the illumination member. Users according to different circumstances bend the serpentine hose, and fix the bended serpentine hose by hanging on some object.

However, such working light needs to be fixed by hanging on some object in service, which brings great restriction to actual operation; once the working light is fixed, an illumination angle of the illumination member is also fixed. When the illumination angle is adjusted, the serpentine hose should also be adjusted, which results in difficult operation. The serpentine hose is connected with the base and illumination member respectively via a buckle and a relevant slot. On one hand this method of connection has poor tightness, which easily results in water or dust entering into the base, the illumination member or the serpentine hose. On the other hand, when separating the serpentine hose from the base or the serpentine hose from the illumination member, the buckle may easily be damaged, which would influence the lifetime of the whole working light. Furthermore, in the situation of poor light or emergency operation, users often assemble a working light mistakenly, such as connecting the base with the illumination member directly, which leads to failure to operate.

Hence, people skilled in the art devote themselves to develop a new working light.

SUMMARY OF THE INVENTION

In view of the above problems of the prior art, the present invention provides a new working light to solve the technical problems.

To achieve the above purposes, the present invention provides a serpentine hose, including a deformable outer hose, as well as a conductive component and a deformable support structure arranged inside said outer hose, characterized in that two ends of said serpentine hose have the same connection structures.

Further, two ends of said serpentine hose respectively have an internal thread for connecting external structures.

Further, said outer hose is a corrugated pipe.

Further, said deformable support structure includes a star-shaped pipe cooperating with said corrugated pipe.

Further, the outer edge of said star-shaped pipe is located at the maximum inner diameter of said corrugated pipe, and the space between the adjacent star structures of said star-shaped pipe corresponds to the space between adjacent maximum inner diameter of said corrugated pipe.

Further, said deformable support structure further includes a flexible metal wire, and said flexible metal wire is arranged inside and penetrates through said deformable support structure.

The present invention provides a working light, including a base, an illumination member and a switch control, a battery which supplies power to said illumination member is arranged inside said base, and said base is connected to said illumination member by a connection portion, characterized in that said base and said illumination member are respectively connected to said connection portion by the same connection structures. By this arrangement, said base cannot be connected to said illumination member directly, and users cannot make mounting errors in use.

Further, said connection portion includes a serpentine hose.

Further, said base is connected to a first end thread of said serpentine hose; said illumination member is connected to a second end thread of said serpentine hose.

Further, the first end thread and the second end thread of said serpentine hose are both internal threads.

The above-mentioned connections between the serpentine hose and the base and between the serpentine hose and the illumination component prevent liquid or dust from entering into the base or the illumination member, increasing the lifetime of the illumination light effectively. In addition, the serpentine hose, the base and the illumination member are separated by unscrewing along the direction of the thread, and the threaded connection is more unbreakable than the cooperation between a buckle and a slot.

Further, said serpentine hose includes a deformable outer hose as well as a conductive component and a deformable support structure arranged inside said outer hose.

Further, said outer hose is a corrugated pipe.

Further, said deformable support structure includes a star-shaped pipe cooperating with said corrugated pipe.

Further, the outer edge of said star-shaped pipe is located at the maximum inner diameter of said corrugated pipe, and the space between adjacent star structures of said star-shaped pipe corresponds to the space between the adjacent maximum inner diameter of said corrugated pipe.

Further, said deformable support structure also includes a flexible metal wire, and said flexible metal wire is arranged inside said deformable support structure.

Further, said metal wire penetrates through said support structure.

By this arrangement, the cooperation between the star-shaped pipe and the corrugated pipe is tight, which effectively improves the hardness of the serpentine hose. The introduction of the flexible metal wire further enhances the supporting effect of the serpentine hose. In particular, when a user exerts force on the serpentine hose to bend it, the bended serpentine hose is able to maintain the current shape under the support of the inside star-shaped pipe and the flexible metal wire. In this way, even though there is no available object to support the serpentine hose, the serpentine hose is able to maintain the current state of bending by itself, to satisfy the needs of users.

Further, one end of said serpentine hose is provided with a groove, the other end of said serpentine hose is provided with a raised line corresponding to said groove, and said raised line is arranged to be inserted into said groove.

The groove and the raised line are arranged to cooperate with each other at two ends of the serpentine hose, whereby two ends of the serpentine hose can be connected to each other by inserting the raised line into the groove, which reduces the space occupied by the serpentine hose for carrying and placing.

Further, said working light includes a joint-sleeve, said base is connected to said illumination member by the joint-sleeve, and said base and said illumination member have the same connection structures for connecting to said joint-sleeve.

Further, said base is connected to a first end thread of said joint-sleeve; and said illumination member is connected to a second end thread of said joint-sleeve.

Further, the first end thread and the second end thread of said joint-sleeve are both internal threads.

Said joint-sleeve is preferably made of insulating material.

The joint-sleeve is replaceably used for connecting the base to the illumination light, and the structure is more compact and easy to carry. In a preferred embodiment of the present invention, the joint-sleeve is an insulating joint-sleeve, an internal thread cooperating with the base is arranged at one end, an internal thread cooperating with the illumination member is arranged at the other end, and the length of said joint-sleeve ensures that the base can supply power to the illumination member.

Further, said illumination member includes a lamp cap and a lamp cap holder, said lamp cap extends along one end of said lamp cap holder, and said lamp cap holder is set to receive power from said base and to provide power to said lamp cap.

Further, said lamp cap is set to be pivotably connected to said end of said lamp cap holder. Under the action of external forces, said lamp cap is able to pivot relatively around said end of said lamp cap holder. Multi-angle illumination of the lamp cap can be achieved, and users only need to change the angle of the lamp cap to adjust the lighting effects.

Further, some protuberances are arranged on said lamp cap, said end of said lamp cap holder is provided with a surface cooperating with said protuberances, and said lamp cap overcomes friction between said protuberances and said surface when pivoting.

Further, the angle between said lamp cap and said end of said lamp cap holder is between 0 to 90°. Further, said protuberances are distributed equidistantly on said lamp cap.

Further, the number of said protuberances is 3 to 10.

The protuberances and the cooperating surface are set on the lamp cap and the connection end of said lamp cap holder, which increases the friction between the lamp cap and the connection end of said lamp cap holder. Thus, after the angle of the lamp cap is determined, the angle is easy to maintain under the action of friction and not easy to change. Multi-angle adjustment of the lamp cap can be achieved by adjusting the location, number, and distance of the protuberances.

Further, a LED lamp and a lens are inside said lamp cap, the light ray of said LED lamp is emitted through said lens, and said lens is set so that the distance between it and said LED lamp is adjustable.

By changing the distance between the lens and the LED lamp, switching between a high beam (for example as a flashlight) and a low beam (for example as a working light) can be achieved, which satisfies users' needs under different conditions.

Further, the shell of said lamp cap is made of transparent material. By this arrangement, the working light in the present invention increases the illuminating brightness, when it is used as a camping light.

Further, the battery in said base is a rechargeable lithium battery.

Further, said base is provided with a magnetic component, such as magnetic iron or magnetic steel. By this arrangement, users can attach the base to an object to fix the illumination light according to a practical need.

Further, the shell of said base is a waterproof and dustproof insulated shell.

Technical Effect

In the present invention since the illumination member and the base of the illumination light have the same connection structures, the base cannot be connected to the illumination member directly, and users would not make mounting errors in use.

Particularly when the illumination portion uses an LED requiring polarity as the light source, mounting errors can be avoided, when users connect a power source with the illumination portion.

In the present invention the light member and the base of the illumination light are connected to the threads of a serpentine hose respectively, to prevent liquid or dust entering into the base or the illumination member. In addition, the threaded connection is unbreakable, increasing the lifetime of the illumination light effectively.

If the base is connected to the illumination member by using an insulating joint-sleeve, the structure is more compact and portable. If the base is connected to the illumination light by using a deformable serpentine hose, the serpentine hose can be bent to fix the illumination member at a certain location. Thus, the illumination member need not to be held in hand, which allows users to do another operation at the same time.

The serpentine hose of the present invention includes a corrugated pipe, a star-shaped pipe and a flexible metal wire. The cooperation between the star-shaped pipe and the corrugated pipe is tight, which can effectively improve the hardness of the serpentine hose, the flexible metal wire being introduced to enhance the supporting effect of the serpentine hose further. According to practical requirements, users can exert force on the serpentine hose to bend the serpentine hose, and the bent serpentine hose is able to maintain a current shape under the support of the star-shaped pipe and the flexible metal wire. In this way, even though there is no available object to support the serpentine hose, the serpentine hose is able to maintain a current state of bending by itself, to satisfy the needs of users.

The groove and the raised line are arranged to cooperate with each other at two ends of the serpentine hose, whereby two ends of the serpentine hose can be connected to each other by the raised line inserted into the groove, which reduces the space occupied by the serpentine hose to carry and place it more easily.

In the present invention, the lamp cap of the illumination member is arranged to be pivotably connected to one end of the lamp cap holder. Under the action of external force, the lamp cap is able to pivot relatively around the lamp cap holder to adjust the illumination angle of the lamp cap, and the application is more flexible.

In conjunction with the following drawings, the present inventive concept, the specific structure and the technical effect are further described to fully disclose the objects, features and effects of the present invention.

DETAILED DESCRIPTION OF THE PREFERRED EMBODIMENTS

Figure 1:
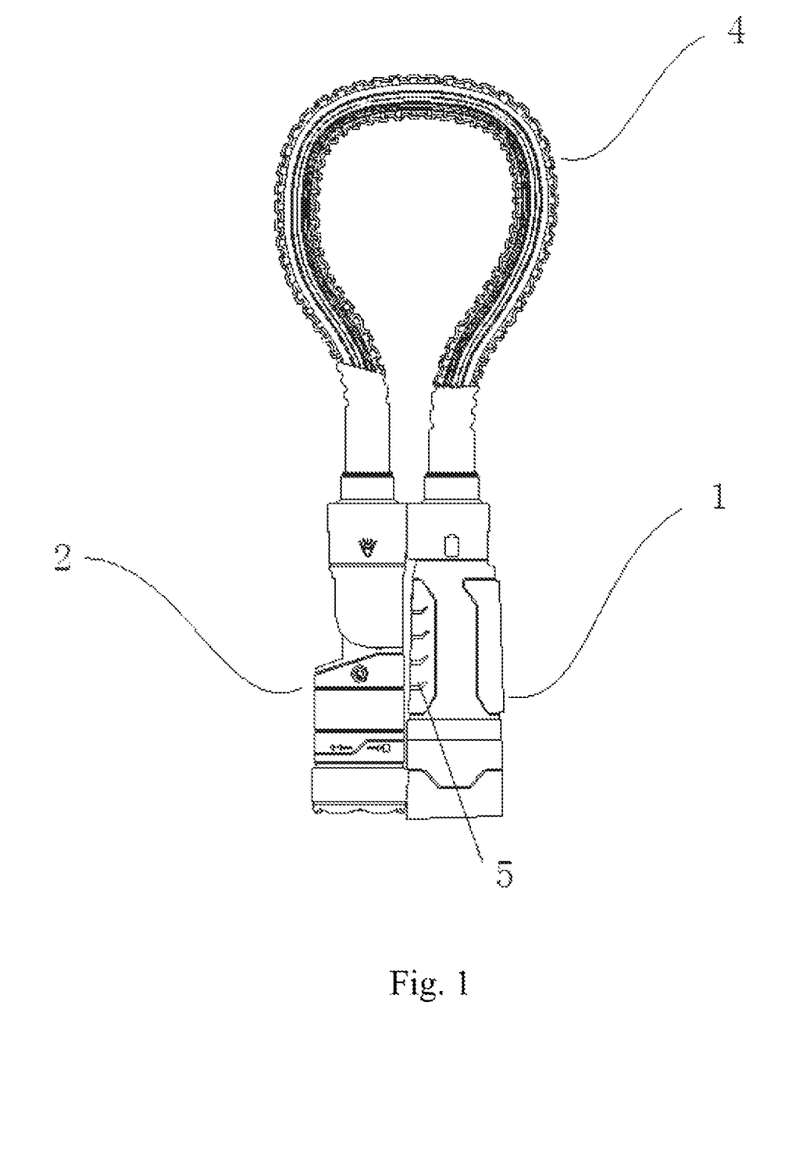
FIG. 1 is a structural view of a working light provided by a preferred embodiment of the present invention.
Figure 2:
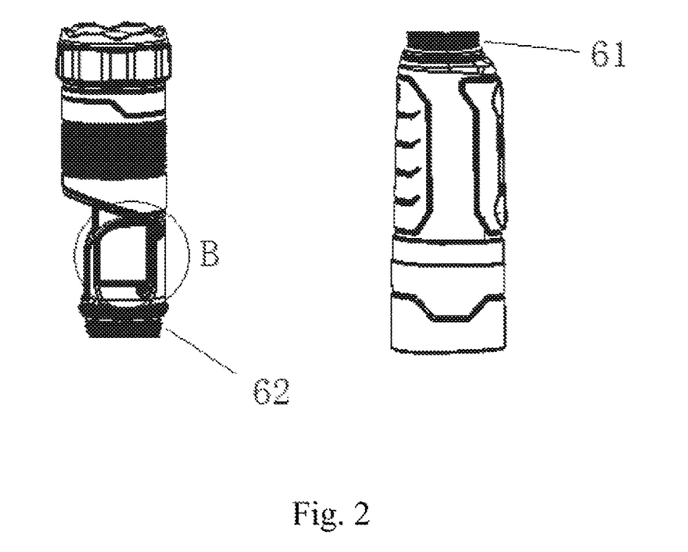
FIG. 2 is a view of a connection structure of the base and the illumination member of the working light provided by a preferred embodiment of the present invention.

FIG. 1 shows a structural view of a working light provided by a preferred embodiment of the present invention. In the present embodiment, the working light includes a base 1, an illumination member 2 and a switch control 5, a battery supplying power to the illumination member 2 is arranged inside the base 1, the base 1 is connected to the illumination member 2 by the deformable serpentine hose 4, the base 1 and the illumination member 2 have the same connection structure for connecting to said serpentine hose 4. FIG. 2 shows a connection structure of the base and the illumination member. In the present embodiment, the base 1 is connected to a first end thread of the serpentine hose 4, the illumination member 2 is connected to a second end thread of the serpentine hose 4, the first end thread and the second end thread are both internal threads, the base 1 has a corresponding external thread at the connection end between the base and the serpentine hose, the illumination member 2 has a corresponding external thread at the connection end between the illumination member and the serpentine hose. The illumination member and the base of the illumination light have the same connection structure 61 and 62, the base is not able to be connected to the illumination member directly, and users would not make mounting errors in use.

The base has an annular electrode slice at the connection end between it and the serpentine hose, an electrode connecting to the annular electrode slice of the base is arranged at the first end of the serpentine hose connecting to the base; the second end of the serpentine hose has the annular electrode slice, the illumination member has an electrode connecting to the annular electrode slice of the serpentine hose at the connection end between it and the serpentine hose. In order to gain better conductivity, the electrodes of the serpentine hose and the illumination member are both elastic poles.

Figure 4:
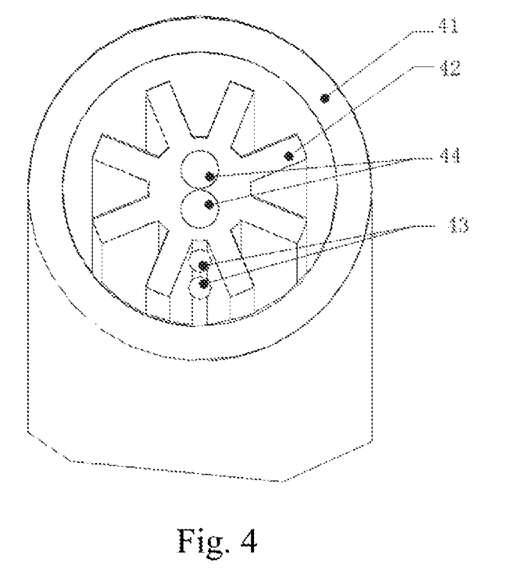
FIG. 4 is a structural view of a serpentine hose of the working light shown in FIG. 1.
Figure 5:
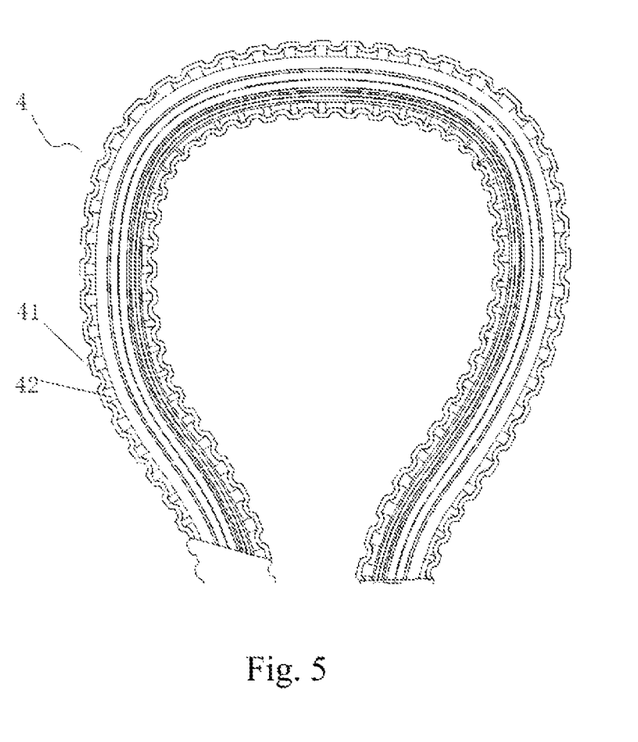
FIG. 5 is a sectional view of a serpentine hose of the working light shown in FIG. 1.

As shown in FIG. 4 and FIG. 5, the deformable serpentine hose includes a corrugated pipe 41, a star-shaped pipe 42 and a flexible metal wire 43, the star-shaped pipe 42 and the flexible metal wire 43 are arranged inside the corrugated pipe 41, the outer edge of the star-shaped pipe 42 is located at the maximum inner diameter of the corrugated pipe 41, the space between adjacent star structures of the star-shaped pipe 42 corresponds to the space between adjacent maximum portions of inner diameter of the corrugated pipe 41. FIG. 4 shows a sectional view of the star structure. The cooperation between the star-shaped pipe and the corrugated pipe is tight, which can effectively improve the hardness of the serpentine hose. The flexible metal wire 43 transfers current for the illumination member 2.

Said deformable serpentine hose further includes an iron wire 44, the iron wire 44 is arranged in the center of the star-shaped pipe 42 and passes through the star-shaped pipe 42. The iron wire enhances supporting effect of the serpentine hose further.

One end of the serpentine hose has a groove, the other end has a raised line corresponding to said groove, the raised line is inserted into the groove to connect the two ends of the serpentine hose together, which reduces the space occupied by the serpentine hose, making it easier to carry and place.

In the working light of the present invention, the base and the illumination member is able to be connected by a joint-sleeve.

Figure 3:
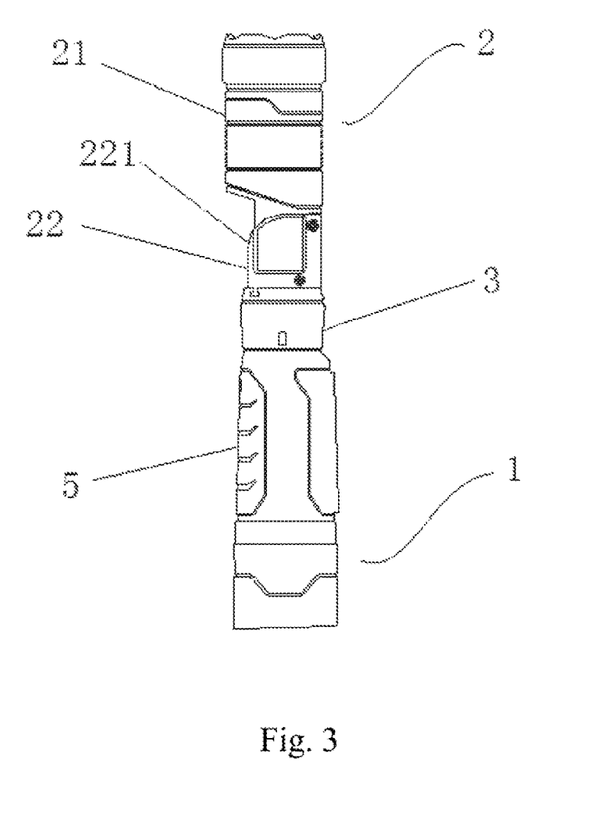
FIG. 3 is a structural view of a working light provided by a preferred embodiment of the present invention.

FIG. 3 shows a structural view of a working light with the joint-sleeve provided by a preferred embodiment of the present invention. The base 1 is connected to the illumination member 2 by the joint-sleeve 3. The base 1 is connected to a first end thread of the joint-sleeve 3; the illumination member 2 is connected to a second end thread of the joint-sleeve 3. The first end and the second end threads of the joint-sleeve 3 are both internal threads. The base 1 has an external thread corresponding to the first end of the joint-sleeve 3 at the connection end between the base and the serpentine hose. The illumination member 2 has an external thread corresponding to the second end of the joint-sleeve 3 at the connection end between the illumination member and the serpentine hose. Since the insulating joint-sleeve is replaceably used for connecting the base to the illumination light, the structure is more compact and easy to carry.

The illumination member 2 includes a lamp cap 21 and a lamp cap holder 22, the lamp cap holder 22 is connected to the joint-sleeve 3 to receive power from the base and provide power to the lamp cap 21, and the lamp cap 21 is pivotably connected to one end 221 of the lamp cap holder 22. Since the lamp cap 21 is able to pivot relatively around the lamp cap holder 22, the multi-angle illumination of the lamp cap is achieved, and users only need to change the angle of the light cap to adjust the lighting effects.

Figure 6:
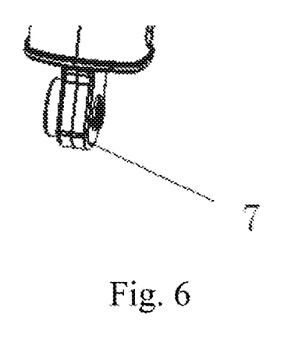
FIG. 6 is a partial enlarged view of a lamp cap of the working light provided by a preferred embodiment of the present invention.

FIG. 6 shows a partial enlarged view of a lamp cap provided by a preferred embodiment of the present invention. The lamp cap 21 has protuberances 7, one end 221 of the lamp cap holder has a surface cooperating with the protuberances, and the lamp cap 21 overcomes friction between said protuberances and said surface when pivoting. The protuberances and the cooperating surface are arranged on the lamp cap and on the connection end of the lamp cap holder, which increases the friction between the lamp cap and the connection end of the lamp cap holder. After the angle of the lamp cap is determined, under the action of friction, the angle of the lamp cap is easy to maintain, and not easy to change. In a preferred embodiment of the present invention, when the protuberances of the lamp cap 21 cooperate with the surface of the lamp cap holder 22, said protuberances hide inside the lamp cap holder 22 throughout. It can effectively prevent dust or dirt to be accumulated on the protuberances which may affect pivoting of the lamp cap.

The angle between the lamp cap 21 and said end 221 of the lamp cap holder can be controlled within 0 to 90°.

The number of the protuberances on the lamp cap 21 is 3 to 10. The multi-angle adjustment of the lamp cap can be achieved by arranging the location, number, and distance of the protuberances.

A high-power LED lamp and a lens are arranged inside the lamp cap 21, the light ray of the LED lamp is emitted through said lens, the lens is arranged so that the distance between it and said LED lamp is adjustable. By changing the distance between the lens and the LED lamp, a switch between far light (e.g. as a flashlight) and close light (e.g. as a working light) can be achieved, which satisfies the needs of users under different conditions.

In a preferred embodiment of the present invention, the shell of the lamp cap 21 is made of transparent material. By this arrangement, the working light increases the illuminating brightness and is usable as a camping light.

The foregoing describes the preferred embodiments of the present invention. It should be understood that one of ordinary skill in the art can make many modifications and changes according to the concept of the present invention without creative work. Therefore, any technical solutions obtained by a person skilled in the art depending on this technical concept according to this invention on the basis of the prior art through logical analysis, reasoning or limited experimentation, should fall in the protection scope determined by the claims.

What is claimed is:

1. A working light, comprising a base, an illumination member and a switch control member, a battery arranged inside the base and configured to supply power to the illumination member, and a connection portion configured to connect the base to the illumination member, the connection portion comprising:
   a deformable outer hose:
   a deformable support structure arranged inside the outer hose and configured to provide support to the outer hose; and
   a conductive component,
   wherein said support structure penetrates through the connection portion;
   said outer hose comprising a plurality of first protrusions and a plurality of first recessions arranged alternatingly along a lengthwise direction of said outer hose;
   said support structure comprising a plurality of second protrusions and a plurality of second recessions arranged alternatingly along a lengthwise direction of said support structure,
   wherein each of the second protrusions is arranged inside a corresponding one of the first protrusions, while each of the second recessions is arranged inside a corresponding one of the first recessions.

2. The working light according to claim 1, wherein outer edges of the second protrusions cooperation tightly with inner sides of the corresponding first protrusions.

3. The working light according to claim 2, wherein the second protrusions are star structures.

4. The working light according to claim 1, wherein the outer hose is a corrugated pipe, and the support structure is a star-shaped pipe.

5. The working light according to claim 1, wherein the support structure further comprises a support member which extends along a lengthwise direction and penetrates through the support structure, and the support member is deformable.

6. The working light according to claim 1, wherein the conductive component is arranged between the outer hose and the support structure.

7. The working light according to claim 1, wherein the base and the illumination member are respectively connected to the connection portion by same connection structures.

8. The working light according to claim 7, wherein the connection structures of the base and the illumination member are external threads, while both ends of the connects portion comprise internal threads which match with the external threads.

9. The working light according to claim 1, wherein the working light further comprises:
   a joint-sleeve positioned and configured to connect the base to the illumination member, and
   the base and the illumination member have same connection structures to connect the joint-sleeve.

10. The working light according to claim 1, wherein the illumination member comprises:
    a lamp cap and a lamp cap holder,
    wherein the lamp cap extends along one end of the lamp cap holder,
    the lamp cap holder is arranged to receive power from the base and is configured to provide power to the lamp cap, and
    the lamp cap is arranged to be pivotably connected to the end of the lamp cap holder.

11. The working light according to claim 10, wherein the lamp cap comprises one or more protuberances arranged on the lamp cap, and
    the end of the lamp cap holder comprises a surface cooperating with said protuberances, and the lamp cap overcomes friction between the protuberances and the surface when pivoting.

12. The working light according to claim 11, wherein a LED lamp and a lens are arranged inside the lamp cap, light of the LED lamp is emitted through the lens, and the lens is arranged as that the distance between it and the LED lamp is adjustable.

13. A serpentine hose for a working light, the serpentine hose comprising:
    a deformable outer hose;
    a deformable support structure positioned inside the outer hose to provide support to the outer hose and penetrating through the serpentine hose;
    the outer hose comprising a plurality of first protrusions and a plurality of first recessions arranged alternatingly along a lengthwise direction of the outer hose;
    the support structure comprising a plurality of second protrusions and a plurality of second recessions arranged alternatingly along a lengthwise direction of the support structure;
    each of the second protrusions is arranged inside one corresponding first protrusion, while each of the second recessions is arranged inside one corresponding first recession,
    wherein outer edges of the second protrusions cooperate tightly with inner sides of the corresponding first protrusions.

14. The serpentine hose according to claim 13, wherein the outer hose is a corrugated pipe, and the support structure is a star-shaped pipe.

15. The serpentine hose according to claim 13, wherein the support structure further comprises a support member which extends along a lengthwise direction and penetrates through the support structure, and the support member is deformable.

16. The serpentine hose according to claim 13, wherein the serpentine hose further comprises a conductive component which is arranged between the outer hose and the support structure.

* * * * *